United States Patent [19]
Chu et al.

[11] Patent Number: 5,774,082
[45] Date of Patent: Jun. 30, 1998

[54] DIGITAL PHASE TO DIGITAL SINE AND COSINE AMPLITUDE TRANSLATOR

[75] Inventors: Sen W. Chu, Torrance; Milos D. Ercegovac, Los Angeles; Kenneth A. Essenwanger, Walnut; Tomas Lang, Irvine; Allen L. S. Sakai, Laguna Niguel, all of Calif.

[73] Assignee: Raytheon Company, Lexington, Mass.

[21] Appl. No.: 816,625

[22] Filed: Mar. 13, 1997

[51] Int. Cl.$^6$ .................................................. G06F 1/00
[52] U.S. Cl. ............................ 341/117; 364/721; 341/50
[58] Field of Search ............................ 341/50, 106, 117; 364/721

[56] References Cited

U.S. PATENT DOCUMENTS

| | | | |
|---|---|---|---|
| 4,160,245 | 7/1979 | Scott | 341/117 |
| 4,905,177 | 2/1990 | Weaver, Jr. et al. | 364/721 |
| 4,975,699 | 12/1990 | Frey | 341/118 |
| 5,276,633 | 1/1994 | Fox et al. | 364/721 |

*Primary Examiner*—Howard L. Williams
*Assistant Examiner*—Peguy JeanPierre
*Attorney, Agent, or Firm*—Leonard A. Alkov; Glenn H. Lenzen, Jr.

[57] ABSTRACT

A digital phase to digital sine and cosine amplitude translator generates sine and cosine outputs from an input angle word, which is decomposed into the most significant bits (MSBs) and the least significant bits (LSBs), and the octant number of the angle is identified by the octant identifier bits. Radix-4 multiplier/adder circuits improve the efficiency of multiplication/addition computations. An incrementor and a decrementor are used for sine and cosine MSB computations, respectively, to further save the computer memory and logic. In a preferred embodiment, the MSBs of the sine and cosine outputs for all octants are generated based upon the octant number of the input angle, and the LSBs of the outputs are generated by trigonometric approximations and octant selection, thereby resulting in a savings in computer memory and logic.

21 Claims, 8 Drawing Sheets

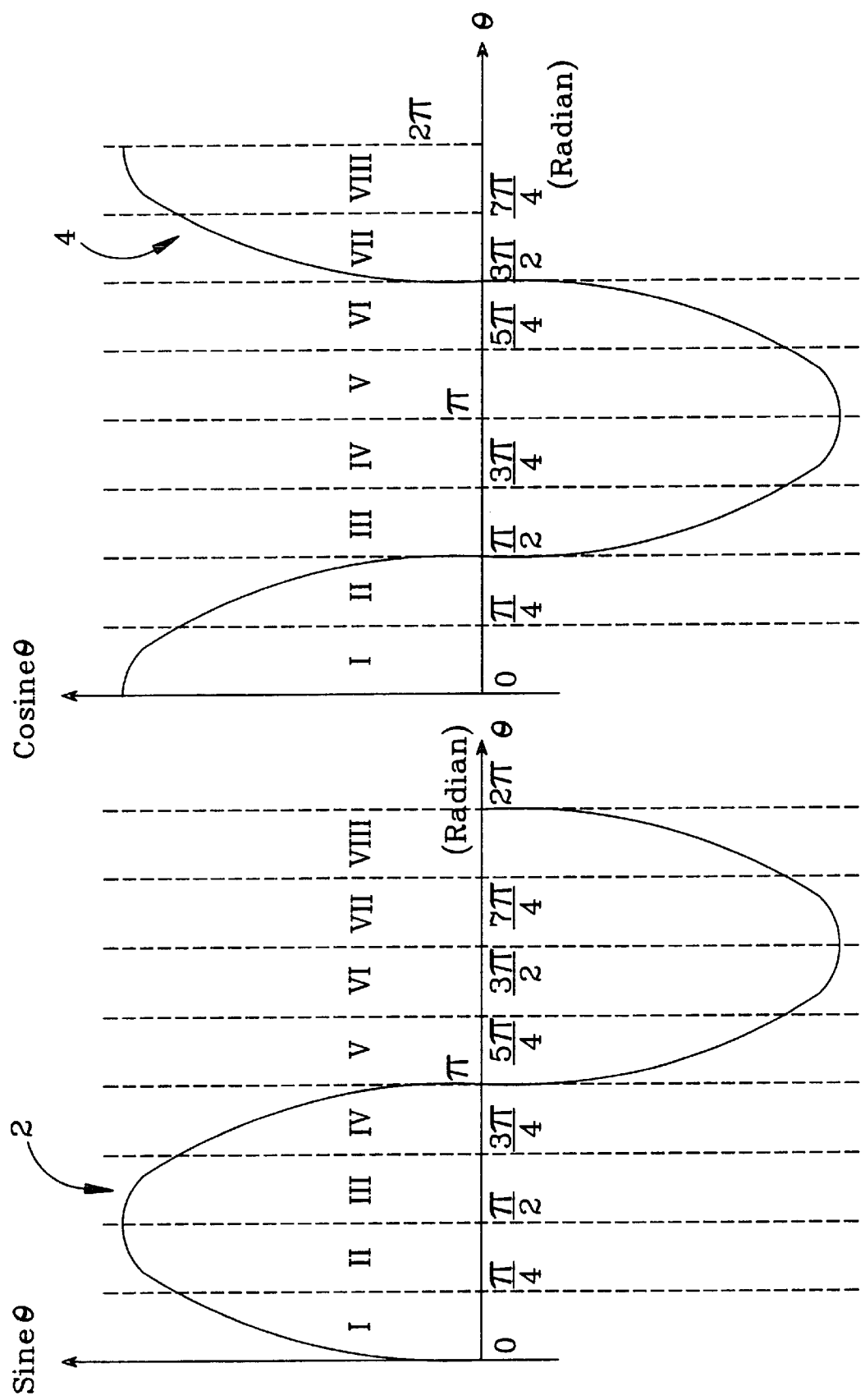

5,774,082

DIGITAL PHASE TO DIGITAL SINE AND COSINE AMPLITUDE TRANSLATOR

BACKGROUND OF THE INVENTION

1. Field of the Invention

This invention relates to generation of digital sine and cosine outputs from an input digital phase angle.

2. Description of the Related Art

Fast translation of a digital input phase angle into a digital sine output has been realized in trigonometric approximation circuits and applied in direct digital synthesizers and digital tuners in a variety of modern communications systems, such as mobile cellular telephones, digital radios and air traffic control. A circuit that performs the translation by decomposing input angles into quadrants and generating sine outputs therefrom is described in U.S. Pat. No. 4,905,177. However, the memory required for storing a table of sine values for a quadrant is large if a sufficiently accurate output is desired. Moreover, the circuit only generates a sine output; if a cosine output is desired, then a separate circuit is required.

Another phase-to-amplitude translation circuit, described in U.S. Pat. No. 4,975,699, assigned to Hughes Aircraft Company, now doing business as Hughes Electronics, has a mixed analog and digital configuration and generates only a sine output. The circuit also suffers from the problem of requiring a separate digital circuit for a cosine output, and in some cases would have compatibility problems with other circuits that are purely digital.

SUMMARY OF THE INVENTION

In view of the above problems, the present invention provides a digital phase to digital sine and cosine amplitude translator that generates both sine and cosine outputs in response to an input angle word. In a preferred embodiment, the translator separates an input angle word into three words, one three-bit word representing the octant number, a second word representing the most significant bits (MSBS) of the phase angle and a third word representing the remaining least significant bits (LSBs). In a preferred embodiment, the sine and cosine curves are divided into octants, and only a limited number of discrete values for one octant each of sine and cosine need be stored to generate sine and cosine values for all octants, the MSBs of which are determined by using symmetric and anti-symmetric properties of sine and cosine. The MSBs of sine and cosine outputs for all octants are generated by an incrementor and a decrementor. Trigonometric approximations are applied to the LSBs to produce the sine and cosine outputs, thereby simplifying the computational circuitry as well as eliminating the need for a separate digital circuit to convert sine into cosine, yet yielding only a small approximation error.

These and other features and advantages of the invention will be apparent to those skilled in the art from the following detailed description, taken together with the accompanying drawings, in which:

BRIEF DESCRIPTION OF THE DRAWINGS

FIGS. 1a and 1b are plots of typical sine and cosine waves, respectively, separated into octants;

DETAILED DESCRIPTION OF THE INVENTION

The present invention provides a digital phase to digital sine and cosine amplitude translator that generates both sine and cosine outputs in response to an input angle word. The translator uses a memory to store only a limited number of values of sine and cosine for the most significant bits (MSBs) of the input angle word for only one octant. The MSBs of sine and cosine outputs for all octants are generated by an incrementor and a decrementor. Trigonometric approximations are used to produce at least some of the least significant bits (LSBs) of the sine and cosine outputs, thereby eliminating the need for storing a large number of values for sine and cosine in the computer memory. The final sine and cosine outputs are produced by selecting the values according to the octant number of the input angle, using the symmetric and anti-symmetric properties of sine and cosine.

FIGS. 1a and 1b show sine and cosine curves $\sin(\theta)$ versus $\theta 2$ and $\cos(\theta)$ versus $\theta 4$ from 0 to $2\pi$ radians, respectively. The sine and cosine curves are separated into $\pi/4$ intervals in the $\theta$ domain, and each interval is called an octant denoted by I, II, . . . VIII. The sine and cosine curves have properties of symmetry and anti-symmetry. For example, octants I and IV of $\sin(\theta)$ are symmetric with respect to $\pi/2$ radian, and octants I and VIII of $\cos(\theta)$ are symmetric with respect to $\pi$ radian. On the other hand, octants IV and V of $\sin(\theta)$ are anti-symmetric with respect to $\pi$ radian, and octants II and III of $\cos(\theta)$ are anti-symmetric with respect to $\pi/2$ radian. These properties are used in the sine/cosine amplitude translator to simplify the circuitry as well as the computations.

Figures 2A, 2B:
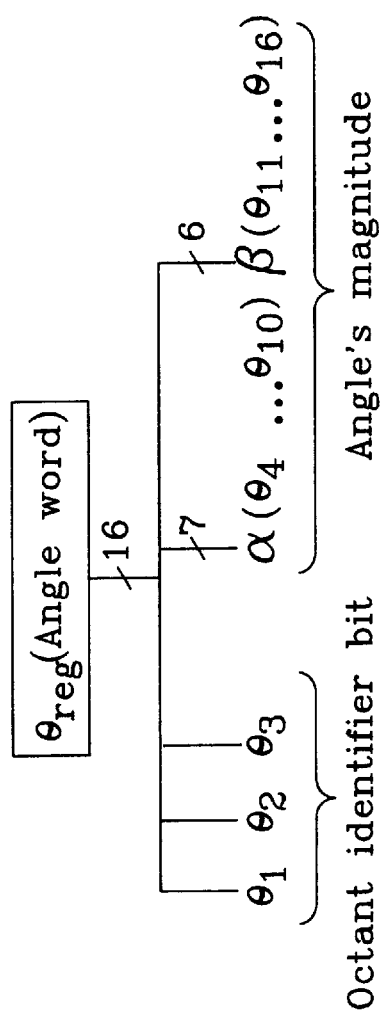
FIG. 2a is a block diagram of a bit allocation to input phase angle scheme used in an embodiment of the invention.
FIG. 2b is a table of an octant identifier bit coding for octant numbers used in an embodiment of the invention.

The radian angle $\theta_{rad}$ is expressed as an angle word $\theta_{reg}$ in a digital memory register, with the relationship $$\theta_{reg} = \frac{4}{\pi} \theta_{rad} \quad (1)$$

to simplify the representation of $\theta_{rad}$ in a computer. In FIG. 2a, the angle word $\theta_{reg}$ is expressed in 16 bits, which include 13 bits ($\theta_4 \ldots \theta_{16}$) to represent the angle's magnitude and 3 bits ($\theta_1, \theta_2, \theta_3$) to represent its octant number. An advantage of using octants is that the sine and cosine curves for all octants can be represented by one octant of sine and one octant of cosine, using the symmetric and antisymmetric properties of sine and cosine. Moreover, only three bits are required to represent the octant numbers. $\theta_4$ is the most significant bit (MSB) for the angle's magnitude, and $\theta_{16}$ is its least significant bit (LSB). The magnitude bits are further divided into two numbers $\alpha$ and $\beta$, with $\alpha$ represented by the 7 higher order bits ($\theta_4 \ldots \theta_{10}$) and $\beta$ represented by the 6 lower order bits ($\theta_{11} \ldots \theta_{16}$). The coding of the octant identifier bits ($\theta_1, \theta_2, \theta_3$) corresponding to the octant numbers are shown in FIG. 2b, with octant I represented by (0,0,0) and octant VIII by (1,1,1). While the invention is described herein in terms of a 16-bit input angle word $\theta_{reg}$, it is also applicable to higher and lower digital resolutions.

The angle $\theta$ is expressed as $\alpha+\beta$, and because $\theta 0$ is much smaller than $\alpha$, the following approximations $$\sin\beta \approx \beta \qquad (2)$$

and $$\cos\beta \approx 1 \qquad (3)$$

are valid for the bit-separated $\theta$. From the trigonometric identities $$\sin(\alpha+\beta)=\sin\alpha\cos\beta+\cos\alpha\sin\beta \qquad (4)$$

and $$\cos(\alpha+\beta)=\cos\alpha\cos\beta-\sin\alpha\sin\beta \qquad (5)$$

and applying the approximate relationships of (2) and (3), the following approximations are obtained:

$$A_{sin}=\sin(\alpha)+\beta\cos(\alpha)\approx\sin(\alpha+\beta) \qquad (6)$$

and $$A_{cos}=\cos(\alpha)-\beta\sin(\alpha)\approx\cos(\alpha+\beta) \qquad (7)$$

where $A_{sin}$ and $A_{cos}$ are the instantaneous amplitudes of $\sin(\theta)$ and $\cos(\theta)$, respectively. The digital sine/cosine amplitude translator of the invention outputs $A_{sin}$ and $A_{cos}$ in response to an input angle $\theta$.

Figure 3:
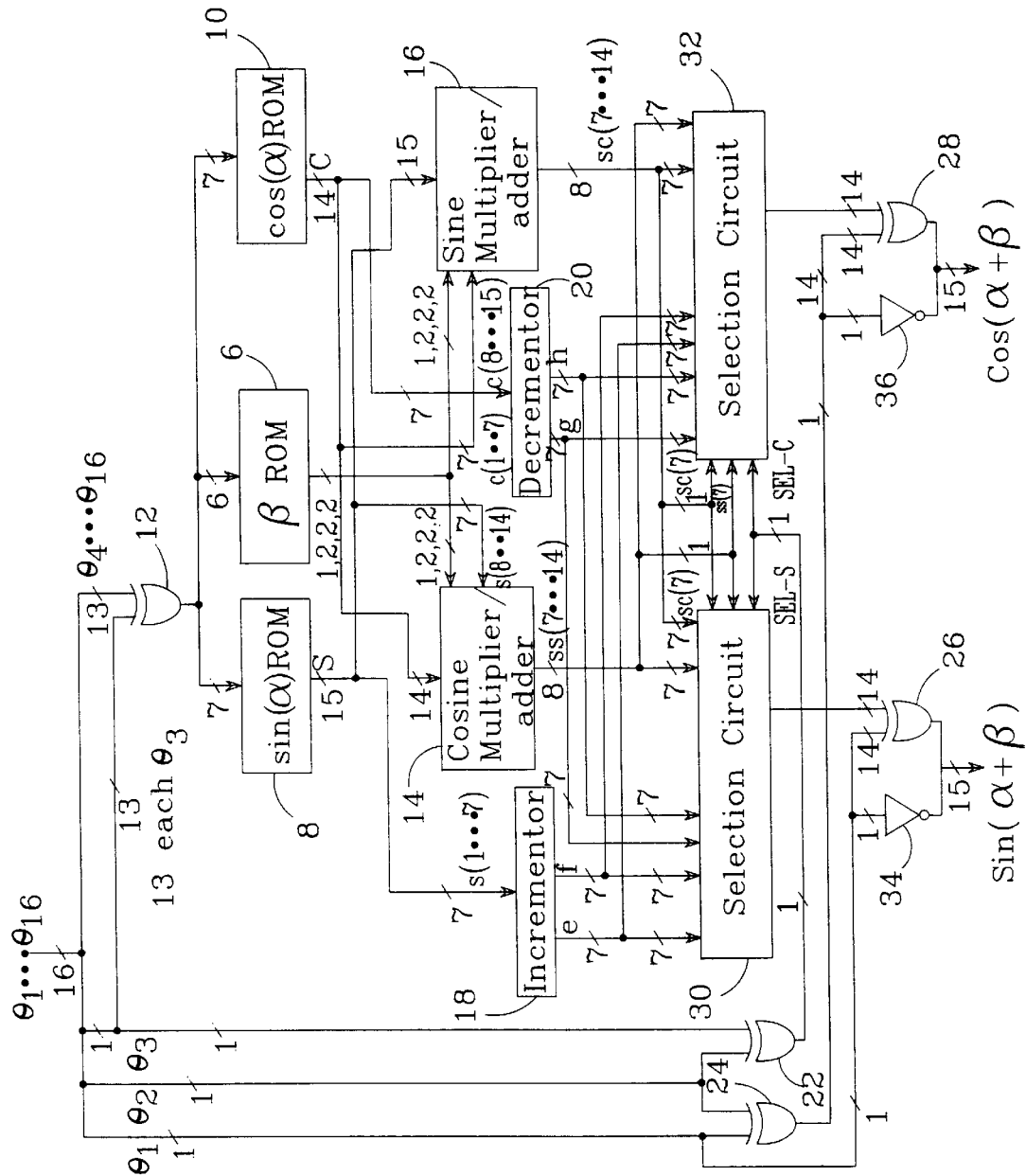
FIG. 3 is a block diagram of an embodiment of the sine/cosine translator.

An embodiment of the invention with three octant identifier bits ($\theta_1$, $\theta_2$, $\theta_3$) is shown in FIG. 3, which includes separate read only memories (ROMs) 6, 8, 10 for $\beta$, $\sin(\alpha)$ and $\cos(\alpha)$, respectively. A particular line input/output is denoted by letters followed by bit digits in parentheses. The number 1 within the parentheses denotes the MSB, while the largest number denotes the LSB. A number next to a slash across a directional line denotes the number of parallel bits on that line. Using the symmetric and anti-symmetric properties of sine and cosine, and the coding of FIG. 2b that assigns bit $\theta_3$ a "0" if the octant number is odd and a "1" if the octant number is even, only one-half of the octants need be computed. The bit $\theta_3$ is XORed with the bits $\theta_4 \ldots \theta_{16}$ by 13 XOR gates in parallel which are represented by a single XOR gate 12 in FIG. 3 to generate an output of 13 bits. The 6 LSBs of the 13-bit output are assigned to the $\beta$ ROM 6 and the 7 MSBs are output to the $\sin(\alpha)$ ROM 8 and the $\cos(\alpha)$ ROM 10. The $\beta$ ROM converts the 6-bit input $\beta$ into a 7-bit $\beta_R$, which is equal to $\beta\pi/4$ as a multiplier for $\sin(\alpha)$ and $\cos(\alpha)$. The $\sin(\alpha)$ and $\cos(\alpha)$ ROMs each store 128 values of $\sin(\alpha)$ and $\cos(\alpha)$, from 0 to $\pi/4$ radians in octant I. As a matter of convenience, octant I is preferably chosen as the designated octant, the sine and cosine values of which are stored in the respective $\sin(\alpha)$ and $\cos(\alpha)$ ROMs. From symmetry, the values in the $\sin(\alpha)$ ROM also correspond to $\alpha$ from $\pi$ to $3\pi/4$ radians in octant IV, while the values in the $\cos(\pi)$ ROM also correspond to $\alpha$ from $2\pi$ to $7\pi/4$ in octant VIII. The $\sin(\alpha)$ and $\cos(\alpha)$ ROMs have 15 and 14 output bits, respectively. The number of bits for the $\cos(\alpha)$ ROM is one less than that for the $\sin(\alpha)$ ROM because the MSB of $\cos(\alpha)$ is always 1 for $\alpha$ from 0 to $\pi/4$ and from $7\pi/4$ to $2\pi$. The $\beta$ ROM preferably converts the input $\beta$ from the six LSBs ($\theta_{11} \ldots \theta_{16}$) of $\theta$ to a seven-digit format denoted by $\beta_R$ that is suitable for multiplication by $\sin(\alpha)$ and $\cos(\alpha)$. It is further preferred that $\beta$ ROM output $\beta_R$ by a radix-4 representation, with two bits assigned to each radix-4 digit to increase the efficiency of computation, although other number systems can also be used. For example, a radix-4 digit has a number set $m_k\epsilon\{-1,0,1,2\}$ for k=2, 3, 4 and $m_1\epsilon\{0,1,2\}$. The $\beta$ ROM outputs $\beta$ in a radix-4 format with a total of 7 bits, including 1 bit for $m_1$ and 2 bits each for $m_2$, $m_3$ and $m_4$. The $\cos(\alpha)$ output of $\cos(\alpha)$ ROM 10 is multiplied by $\beta_R$ in a cosine multiplier/adder circuit 14 to obtain $\beta\cos(\alpha)$. Both inverted and noninverted values of $\sin(\alpha)$ are available from the $\sin(\alpha)$ ROM. Both $\cos(\alpha)$ and inverted values of $\cos(\alpha)$ are available from the $\cos(\alpha)$ ROM as well. The following negative recoding

| $m_k$ | Positive Recoding | Negative Recoding |
|---|---|---|
| 0 | 0 | 1 |
| 1 | $C_i$ | $\bar{S_i}$ |
| 2 | $C_{i-1}$ | $\bar{S_{i-1}}$ |
| -1 | $C_i$ | $S_i$ | of $\sin(\alpha)$ and $\cos(\alpha)$ is used, in which $C_i$ denotes the $i^{th}$ digit for $\cos(\alpha)$ and $S_i$ denotes the ith digit for $\sin(\alpha)$. Therefore, both non-inverted and inverted values of $\sin(\alpha)$ and $\cos(\alpha)$ are available with this recoding technique. The negative value of $\sin(\alpha)$ multiplied by radix-4 $\beta_R$ in a cosine multiplier/adder circuit 14. $\beta\cos(\alpha)$ and $-\beta\sin(\alpha)$ are added to the low bits S(8 ... 15) of $\sin(\alpha)$ and C(8 ... 14) of $\cos(\alpha)$ in respective multiplier/adder circuits 16 and 14, to obtain the LSBs of $\sin(\alpha)+\cos(\alpha)$ in octants I and IV, and the LSBs of $\cos(E)-\beta\sin(\alpha)$ in octants I and VIII, respectively. According to equations (6) and (7), $\sin(\alpha)+\beta\cos(\alpha)$ is an approximation of $\sin(\alpha+\beta)$ while $\cos(\alpha)+\beta\sin(\alpha)$ is an approximation of $\cos(\alpha+\beta)$.

Figure 5:
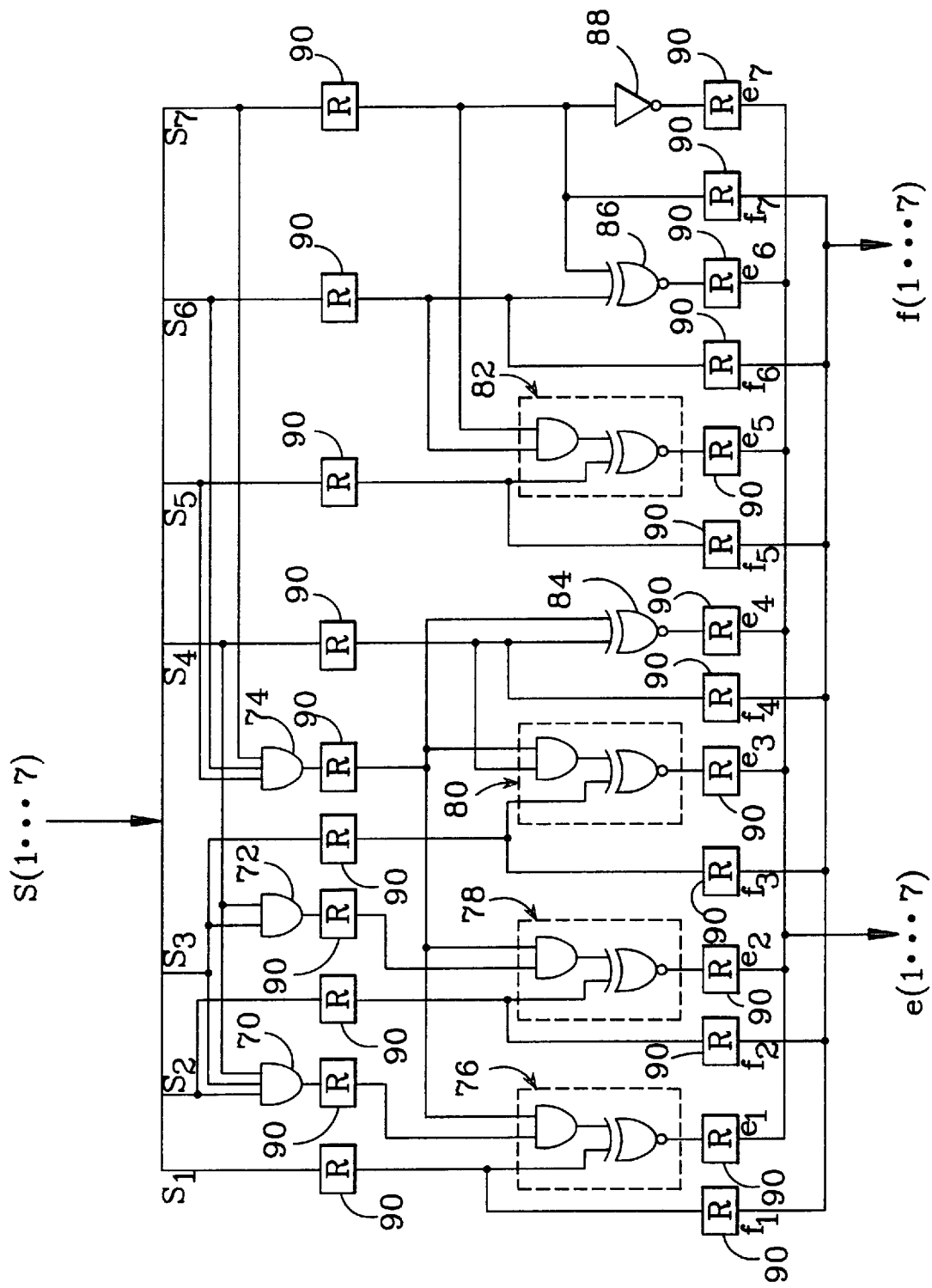
FIG. 5 is a circuit diagram of a preferred embodiment of the incrementor of FIGS. 3 and 4.
Figure 6:
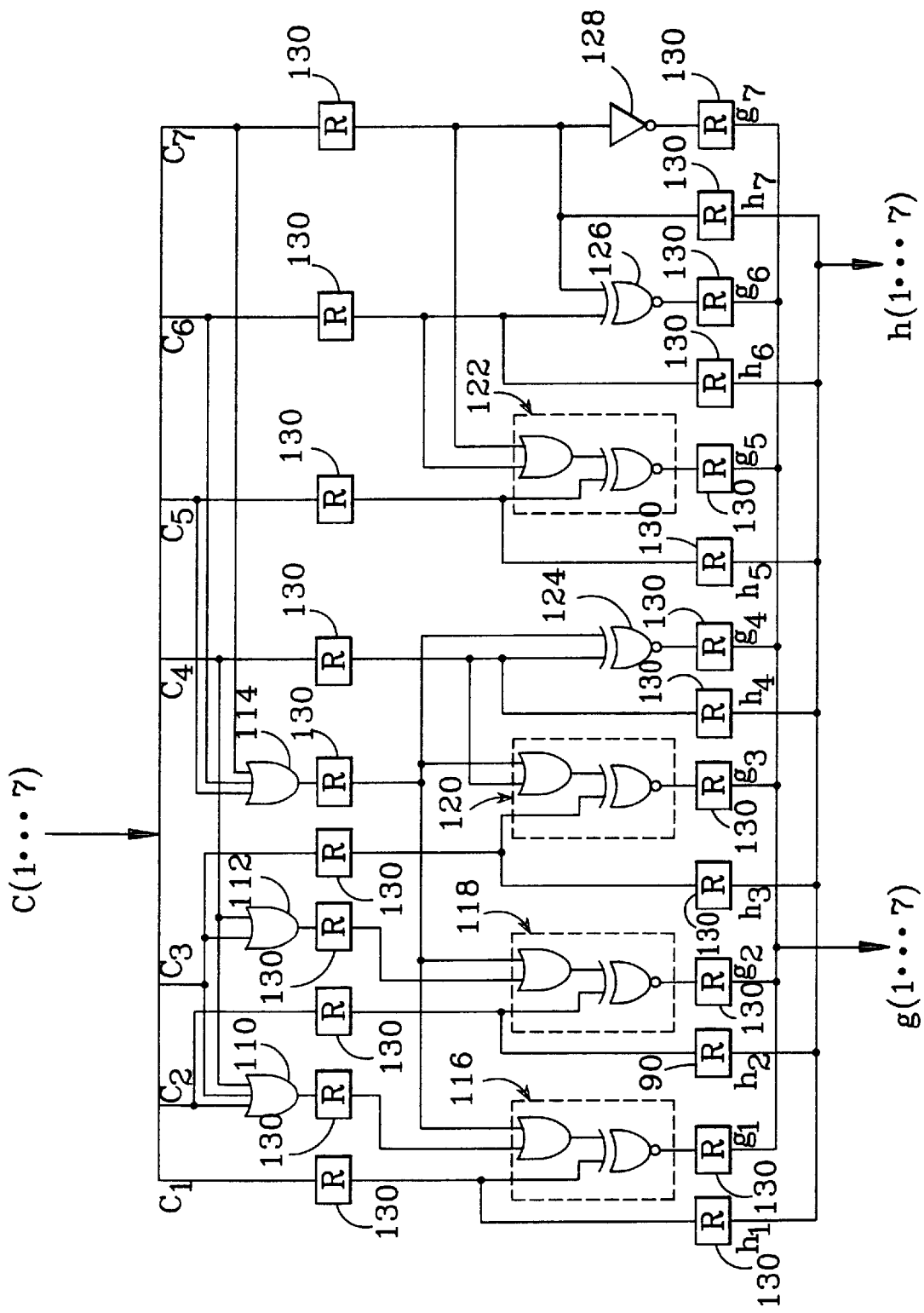
FIG. 6 is a circuit diagram of a preferred embodiment of the decrementor of FIGS. 3 and 4.

The MSBs S(1 ... 7) of sin(a) and C(1 ... 7 of $\cos(\alpha)$ are output from respective $\sin(\alpha)$ and $\cos(\alpha)$ ROMs to an incrementor 18 and a decrementor 20, respectively, to obtain the MSB values of sine and cosine that cover the whole octant I from 0 to $\pi/4$ radians. Preferred embodiments of the incrementor and the decrementor are shown in FIGS. 5 and 6, respectively, and are described below. The incremented MSB values of S(1 ... 7) are output through line e, while the non-incremented MSB values of S(1 ... 7) are output through line f. Similarly, the decremented MSB values of C(1 ... 7) are output through line g, while the non-decremented MSB values of C(1 ... 7) are output through line f.

The MSB outputs from the incrementor 18 and the decrementor 20 and the LSB outputs from the multiplier/adder circuits 14 and 16 are sufficient to represent sine and cosine curve segments of all octants. For example, referring back to FIGS. 1a and 1b, the cosine curve segment in octant II is identical to the sine curve segment in octant IV, and the sine curve segment in octant III is identical to the cosine curve segment in octant I. The negative sine and cosine curve segments have their respective inverses in the positive octants. For example, the sine curve segment in octant VIII is the negative (or mirror image) of that in octant IV, and the cosine curve segment in octant III is the negative of that in octant VII. A logic circuit with XOR gates 22, 24, 26 and 28 uses these properties and the coding table of FIG. 2b to select the octant number of sine and cosine outputs by respective selection circuits 30, 32 to obtain final digital sine and cosine functions from the octant identifier bits ($\theta_1$, $\theta_2$, $\theta_3$). The XOR gates 22 and 24 which XOR the octant identifier bits $\theta_3$ and $\theta_2$, and $\theta_2$ and $\theta_1$, respectively. The output of XOR gate 22 sends a signal SEL-S and SEL-C to the sine and cosine selection circuits 30, 32, respectively, to select the correct octant for the MSBs and LSBs of the sine and cosine outputs.

The signs of the cosine and sine are then determined to generate the final signed sine and cosine outputs. Referring to FIGs. 1a and 2b, the sine output is positive if $\theta_1$ equals 0 and negative if $\theta_1$ equals 1, while the cosine output is positive if $\theta_1$ and $\theta_2$ are both 1 or both 0 and negative otherwise. Returning to FIG. 3, the octant bit $\theta_1$ is inverted in a NOT gate 34 to produce a sign bit, which is 1 if positive and 0 if negative. $\theta_1$ is XORed with all the bits from the output of selection circuit 30 in XOR gate 26 to generate a final sine output. If the sine function is positive, i.e., $\theta_1$ is 0, the sine magnitude output remains unchanged; if the sine function is negative, i.e., $\theta_1$ is 1, the sine magnitude output is complemented. There are 15 sine output bits, with 14 magnitude bits and 1 sign bit. For the sign of the cosine output, the $\theta_1 \oplus \theta_2$ output from XOR gate 24 produces an output of 1 if the cosine is positive and 0 if the cosine is negative. The output from the XOR gate 24 is inverted in the NOT gate 36 to produce a sign bit, which is 1 if positive and 0 if negative. Similar to the XOR gate 26 for the sine output, XOR gate 28 is connected to XOR the outputs from the XOR gate 24 and the selection circuit 32 to generate a final cosine output. The cosine magnitude output is unchanged if the sign is positive but is complemented if the sign is negative. There are 15 cosine output bits, including 14 magnitude bits and 1 sign bit.

Figure 4:
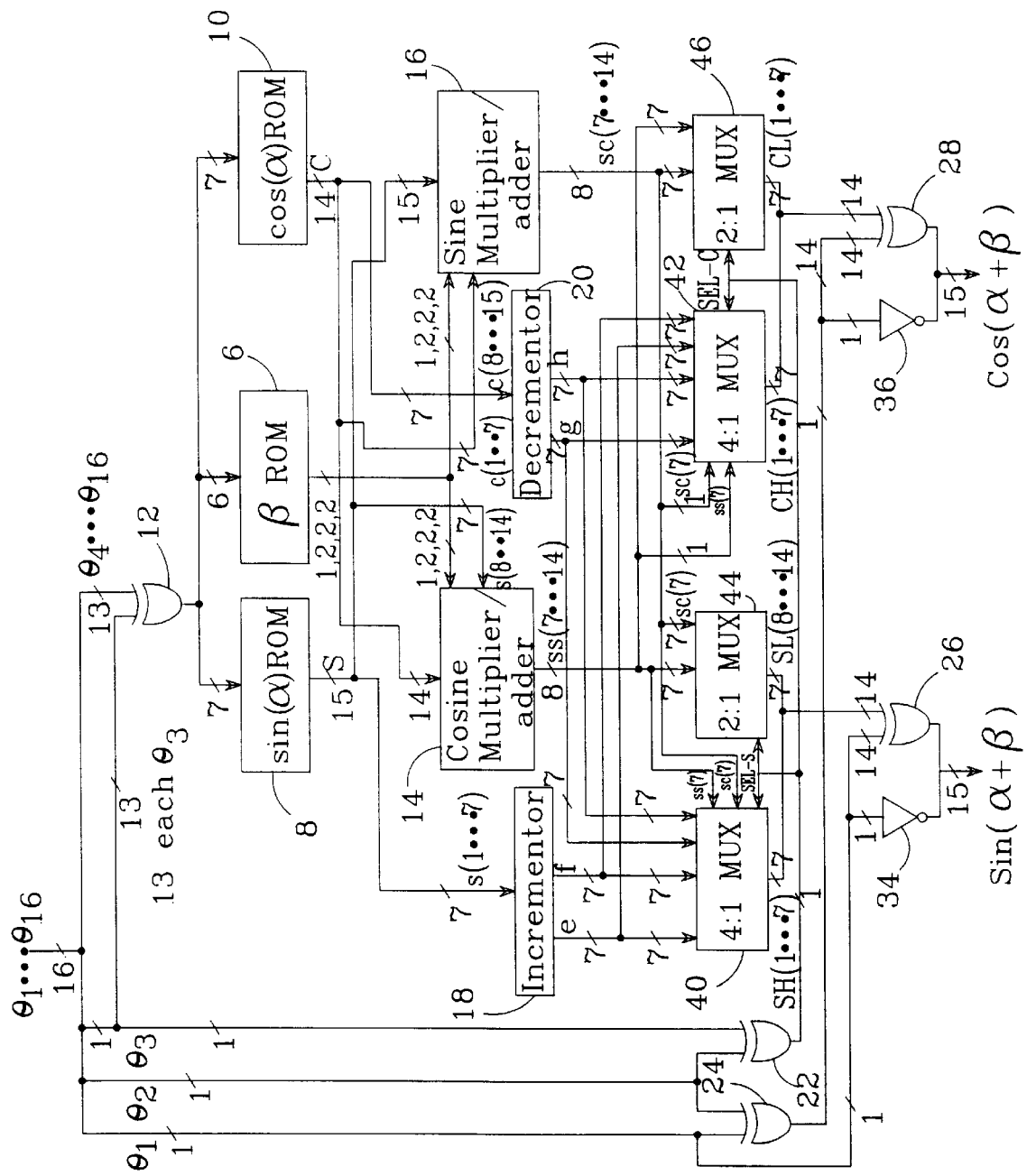
FIG. 4 is a block diagram of a preferred embodiment of the sine/cosine translator.

FIG. 4 shows a preferred embodiment of the phase to sine/cosine amplitude translator which is similar to FIG. 3, but with each of the selection circuits decomposed into a 4:1 multiplexer (MUX) for the MSBs and a 2:1 MUX for the LSBS. As in FIG. 3, an angle word $\theta(1 .. 13)$ with 13 magnitude bits is separated into 7 MSBs as a number $\alpha$, and 6 LSBs as another number $\beta$. $\beta$ is converted into radix-4 digits in the $\beta$ ROM 6, which stores 64 8-bit words corresponding to the 4 most significant radix-4 digits ($m_1$, $m_2$, $m_3$, $m_4$) of $\beta_R$ that is equal to $\beta\pi/4$ and rounded to 14 bits. A radix-4 digit preferably has a number set $m_k \in \{-1,0,1,2\}$ for k=2, 3, 4 and $m_1 \in \{0,1,2\}$. Each radix-4 digit is represented by no more than 2 binary bits. The $\beta$ ROM outputs $\beta_4$ in a radix-4 format with a total of 7 bits, including 1 bit for $m_1$ and 2 bits each for $m_2$, $m_3$ and $m_4$. The MSBs $\alpha$ is directed to sin($\alpha$) ROM 8 and cos($\alpha$) ROM 10, each storing 128 values of sin($\alpha$) and cos($\alpha$) and outputting a 15-bit word denoted S for sin($\alpha$) (coarse octant only) and a 14-bit word denoted C for cos($\alpha$) (coarse octant only), respectively. As the desired precision of sine and cosine computations may differ from the preferred embodiment, the number of bits for the ROMs may be more or less than those described herein.

The S bits are provided in both non-inverted and inverted forms S and $\overline{S}$, which are both available in the generation of multiples for the multiplier/adder circuits. For C bits, both non-inverted and inverted forms C and $\overline{C}$ are also available. The non-inverted and inverted bits are provided by the recoding described above. The C bits are multiplied by $\beta$ from $\beta$ ROM in another radix-4 multiple generator within the cosine multiplier/adder circuit 14 to generate the radix-4 digits $m_1\cos(\alpha)$, $m_2\cos(\alpha)$, $m_3\cos(\alpha)$ and $m_4\cos(\alpha)$. The inversion of S bits is achieved by interpreting the recoded bits for $m_k$=1 or 2 and generating a 1 in the LSB of the corresponding summand. The sine multiplier/adder circuit 16 performs the computations of cos($\alpha$)−$\beta$sin($\alpha$) for LSBs, and the cosine multiplier/adder circuit 14 performs the computations of sin($\alpha$)+$\beta$cos($\alpha$) for LSBS.

The seven MSBsS (1 ... 7) of the S word are processed by an incrementor 18, which receives from the sin($\alpha$) ROM 8 the MSBs of coarse octant sine values and generates the MSBs of the sine values that cover the whole octant I. The sin($\alpha$) ROM need only store a lower portion of the sine curve in octant I as discrete values. The incrementor then converts the values from the sin($\alpha$) ROM into an upper portion of the sine curve in octant I, the upper and lower portions together covering the whole octant. The MSBs of sine output are selected by a 4:1 MUX 40, which selects the octant number according to the signal SEL-S, and between the incremented input e and the non-incremented input f based upon control inputs ss(7) or sc(7), which represents the most significant bit from the sine or cosine multiplier/adder output, respectively. The input ss(7) or sc(7) determines whether the sine value belongs to the lower portion or the upper portion within that octant. Whether the final MSBs of the sine output comes from the sine MSBs or cosine MSBs is determined by the SEL-S signal. The sign of the final sine output is determined by the inverter 34, and the magnitude bits of the sine output are complemented by the XOR gate 26 if the sign is negative.

A preferred embodiment of the incrementor 18 is shown in FIG. 5. S1, S2, ... S7 represent the seven MSBs of the S word, S1 being the most significant of the seven digits. The S1 ... S7 line inputs are connected to an incrementor circuit that includes AND gates 70, 72, 74, AND-XOR-NOT circuits 76, 78, 80, 82, XOR-NOT gates 84, 86, a NOT gate 88, and a plurality of flip-flops 90 connected to temporarily store the incremented and non-incremented outputs e and f. S2, S3 and S4 are ANDed by the AND gate 70, S3 and S4 are ANDed by the AND gate 72, and S5, S6 and S7 are ANDed by the AND gate 74. The AND-XOR-NOT circuits 76, 78, 80, 82 are connected to produce outputs e1, e2, e3, and e5, respectively. A master-slave flip-flop (or register) is made with two latches (master and slave), which temporarily hold the outputs from the respective logic gates to synchronize the outputs. The non-incremented outputs f1, f2, ... f7 are preferably connected to the S1, S2, ... S7 inputs via two master-slave flip-flops. The incremented outputs e1, e2, ... e7 each have a single flip-flop on each input line and another flip-flop at the output. The seven digits e1, e2, ... e7 from the outputs of the respective AND-XOR-NOT circuits 76, 78, 80, XOR-NOT gate 84, AND-XOR-NOT circuit 82, XOR-NOT gate 86, and NOT gate 88, with e1 being the most significant digit, are represented by line e in FIGS. 3 and 4. The inputs S1, S2, ... S7 are transferred via respective double registers to non-incremented outputs f1, f2, ... f7, which are represented by line f in FIGS. 3 and 4.

The seven MSBs C(1 ...7) of the C word are processed by a decrementor 20, which receives from the cos($\alpha$) ROM 10 the MSBs of coarse octant cosine values and generates the MSBs that cover the whole octant I. The cos($\alpha$) ROM need only store an upper portion of the sine curve in octant I as discrete values. The decrementor then converts the values from the cos(a) ROM into a lower portion of the cosine curve in octant I, the upper and lower portions together covering the whole octant. The MSBs of cosine output are selected by a 4:1 MUX 42, which selects the octant number according to the signal SEL-C, which is the same as SEL-S. The control input sc(7) or ss(7) determines whether the cosine value belongs to the upper portion or the lower portion within that octant. Whether the final MSBs of the sine output comes from the sine MSBs or cosine MSBs is determined by the SEL-C signal. The sign of the final cosine output is determined by the inverter 36, and the magnitude bits of the cosine output are complemented by the XOR gate 28 if the sign is negative.

A preferred embodiment of the decrementor 20 is shown in FIG. 6. C1, C2, ... C7 represent the seven MSBs of the C word, C1 being the most significant of the seven digits. The C1 ... C7 line inputs are connected to a decrementor circuit that includes OR gates 110, 112, 114, OR-XOR-NOT circuits 116, 118, 120, 122, XOR-NOT gates 124, 126, a NOT gate 128, and a plurality of registers 130 connected to temporarily store the decremented and non-decremented outputs g and h, respectively. C2, C3 and C4 are ORed by the OR gate 110, C3 and C4 are ORed by the OR gate 112, and C5, C6 and C7 are ORed by the OR gate 114. The OR-XOR-NOT circuits 116, 118, 120, 122 are connected to produce outputs g1, g2, g3, and g5, respectively. The non-decremented outputs h1, h2, ... h7 are preferably connected to the C1, C2, ... C7 inputs via two master-slave flip-flops to synchronize the outputs. The decremented outputs g1, g2, ... g7 each have a single register on each input line and another register at the output. The seven digits g1, g2, ... g7 from the outputs of the respective OR-XOR-NOT circuits 116, 118, 120, XOR-NOT gate 124, OR-XOR-NOT circuit 122, XOR-NOT gate 126, and NOT gate 128, with g1 being the most significant digit, are represented by line g in FIGS. 3 and 4. The inputs C1, C2, ... C7 are transferred via respective double registers to non-decremented outputs h1, h2, ... h7, which are represented by line h in FIGS. 3 and 4.

Figure 7:
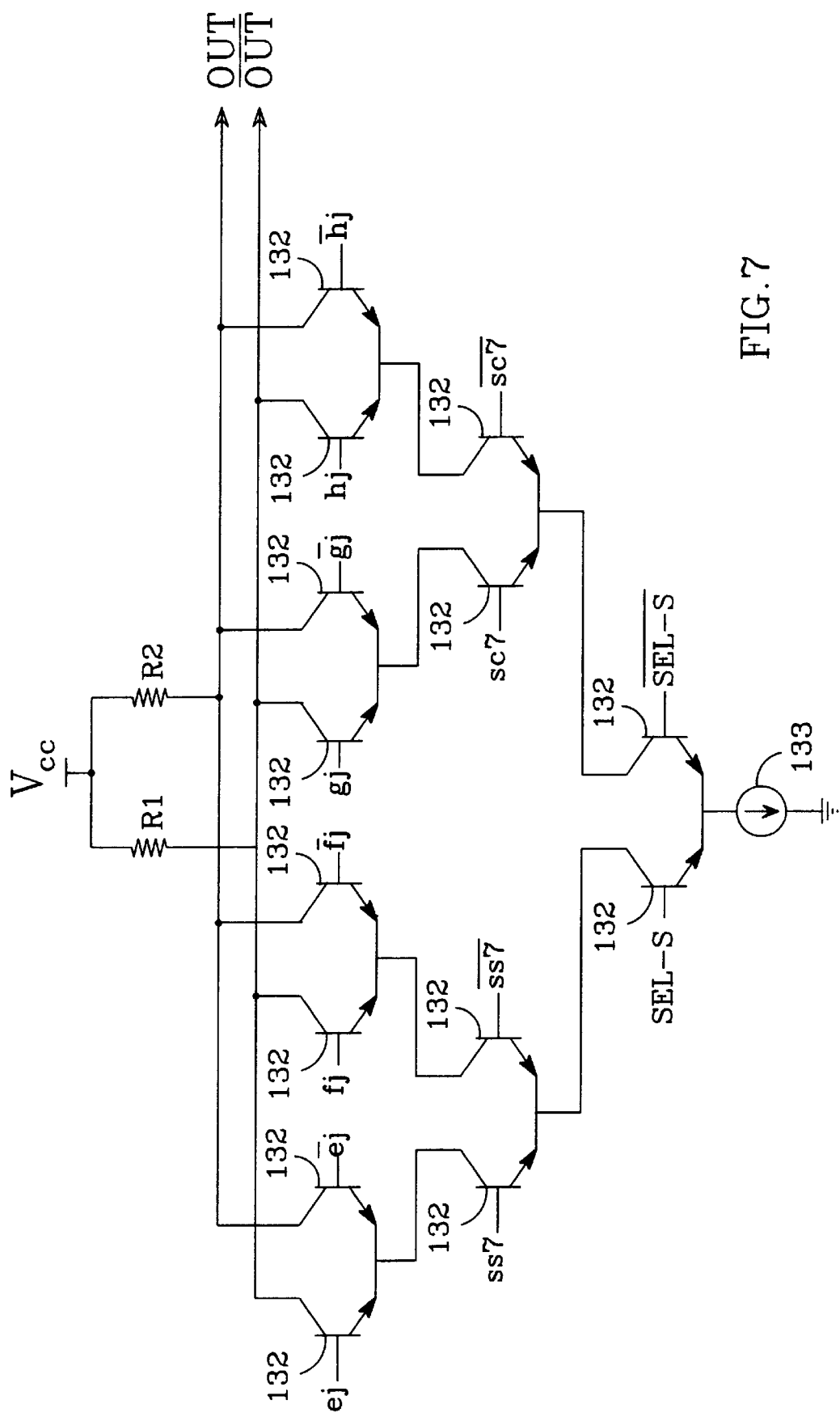
FIG. 7 is a circuit diagram of a preferred embodiment of the sine selector of FIGS. 3 and 4.

Each of the inputs e, f, g, h has seven parallel digits representing the seven MSBs of one octant of sine and cosine. The 4:1 MUXs 40 and 42 select the final MSB outputs of sine and cosine, respectively, from one of the four inputs e, f, g, h according to the control input signal SEL-S and SEL-C, respectively. The SEL-S and SEL-C signals are the same and have two possible states 0 and 1 depending upon the octant numbers. A preferred embodiment of the 4:1 MUX 40 for the MSBs of sine output, shown in FIG. 7, is a differential transistor-pair logic network with transistor switches 132, a DC bias voltage $V_{cc}$, load resistors $R_1$ and $R_2$, and a current source 133 connected to ground. The inputs SEL-C, sc7, ss7, $g^j$, $h_j$, $e_j$ and $f_j$ and their complements are connected to the respective bases of the respective transistor pairs. The transistors are connected to select the sine output in response to SEL-S, ss7, sc7, e, f, g, h, and their complements as inputs to the bases of the respective transistors. SEL-S is 1 if θ is in octant I, IV, V or VIII, and 0 otherwise. The SEL-S is determined by $\overline{\theta_2 \oplus \theta_3}$, where $\theta_2$ and $\theta_3$ are the octant identifier bits in FIG. 2b. $e_j$, $f_j$, $g_j$ and $h_j$ represent the $j^{th}$ bit of the inputs e, f, g and h, respectively, where j is an integer from 1 to 7. e and f represent S(1 ... 7) with and without increment, respectively, while g and h represent C(1 ... 7) with and without decrement, respectively. The circuit of FIG. 7 is the same for all seven bits. If SEL-S is 0, meaning that θ is in one of the octants II, III, VI and VII, then the inputs g and h from the cosine computations are used for sin(θ) in these octants. If g and h are selected, then the control input sc(7) selects the output based upon whether sc(7) is 1 or 0. If sc(7) is 1, which represents a "borrow," then g is selected; otherwise, h is selected. If SEL-S is 1, the inputs e and f are selected. The bit ss(7) represents a "carry" for the incrementor. If ss(7) is 1, the incremented value e for sine MSBs is selected; otherwise, the non-incremented value f is selected. Because of the property sin(θ+π)=−sin(θ), the sign of sin(θ) is reversed if the octant number is increased or decreased by four. The selector 68 outputs the seven high bits SH(1 ... 7) for the sine output.

Figure 8:
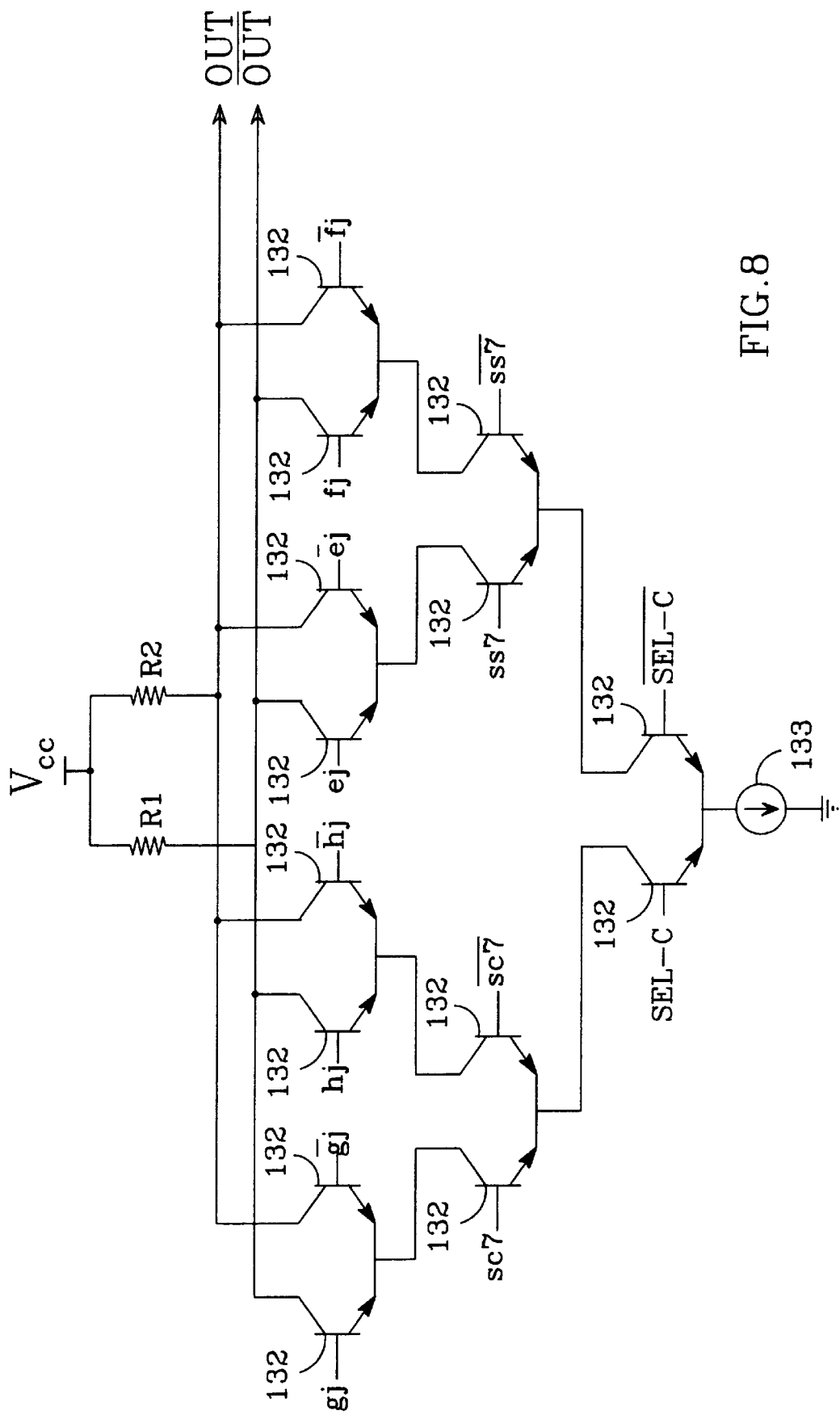
FIG. 8 is a circuit diagram of a preferred embodiment of the cosine selector of FIGS. 3 and 4.

For the MSBs of cosine output, another selector 136 has data inputs g, h, e, f and control inputs sc(7), ss(7) and SEL-C, which has two possible states 0 and 1 depending upon the octant numbers. A preferred embodiment of the selector circuit is shown in FIG. 8, which is similar to FIG. 7 except that SEL-S, ss(7), sc(7), e, f, g and h are replaced by SEL-C, sc (7), ss(7), g, h, e and f, respectively. If SEL-C is 0, meaning that θ is in one of the octants II, III, VI and VII, then the inputs e and f from sine computations must be used for cos(θ) in these octants, with the selection between e and f based upon the control input ss(7) similar to FIG. 7 described above. If SEL-C is 1, inputs g and h are selected. The bit sc(7), which represents a "borrow" for the decrementor, switches the MSBs of cosine output to g if sc(7) is 1 and h otherwise. The sign of cos(θ) is determined by using the fact that the sign is reversed every four octants based upon the identity cos(θ+π)=−cos(θ). The selector 106 outputs the seven high bits CH(1 ... 7) for the cosine output.

To avoid a subtractor in the implementation of the translator, an LSB weighted 1 for the binary truncated representation of sin(α) is subtracted from sin(α). The LSB weight of truncated sin(α) is made to be one bit greater in weight than the MSB weight of −(β²/2)sin(α) For the 15-bit resolution implementation, the MSB of β is in the $7^{th}$ bit location with a weight of $2^{-7}$. For octant look-up the maximum value for sin(α) is approximately $2^{0.5}$, that is, sin(π/4)=$2^{0.5}$. Thus, if only the MSB of β is considered to be 1 and all other bits of β are ignored, (zero for this error term only), then $$\frac{\beta^2_{MSB}}{2} \sin(\alpha) = \frac{(2^{-7})^2}{2} \sin(\alpha) = \frac{2^{-15}}{\sqrt{2}} \quad (8)$$

The alignment of $2^{-15}/\mathrm{sqrt}(2)$ would have the MSB in the $15^{th}$ bit position. Thus if sin(α) has 14 bits instead of 15 bits, the correction term $$\frac{\beta^2_{MSB}}{2} \sin(\alpha) \quad (9)$$

is accommodated at the input of the existing multiplier utilizing existing adders for bits below the C(8 ... 14) vector. For the S(8 ... 15) vector, the $15^{th}$ bit is required.

Returning to FIG. 4, the seven less significant bits SL(8 ... 14) for the sine output are generated by a 2:1 MUX 44, which has two inputs ss(8 ... 14) and sc(8 ... 14), for the LSBs of sin(θ) in octants I and IV and cos(θ) in octants I and VIII, respectively. SEL-S selects one of the inputs as the LSBs for the final sine output. If SEL-S is 1, then ss(8 ... 14) is selected; otherwise, sc(8 ... 14) is selected. The seven MSBs SH(1 ... 7) from the 4:1 MUX 40 and the seven LSBs SL(8 ... 14) from the 2:1 MUX 44 together form the sine output with a 14-bit precision. The sign bit is generated by the inverter 34.

The seven low bits CL(8 ... 14) for the cosine output are generated by a 2:1 MUX 46, which has two inputs sc(8 ... 14) and ss(8 ... 14), for cos(θ) in octants I and VIII and sin(θ) in octants I and IV, respectively. SEL-C selects one of the inputs as the output CL(8 ... 14) in a manner similar to the 2:1 MUX 44, except that sc(8 ... 14) is selected if SEL-C is 1 and ss(8 ... 14) is selected if SEL-C is 0. The seven MSBs CH(1 ... 7) from the 4:1 MUX 42 and the seven LSBs CL(8 ... 14) from the 2:1 MUX 46 together form the cosine output with a 14-bit precision. The sign bit is generated by the inverter 36.

An advantage of the invention is that the size of the sin(α), cos(α) and βROMs and all digital logic circuitry and registers combined is much smaller than the ROM required to store two conventional lookup tables for sin(α+β) and cos(α+β), each of which requires a memory of $2^{(α+β)}$ words. The ROMs required for sin(α), cos(α) and β in the present invention are $2^1$, $2^a$ and $2^β$, respectively, the sum of which is much smaller than $2 \times 2^{(α+β)}$ required for the conventional lookup tables. Moreover, the sin(α) and cos(α) ROMs need to store only the first octant of sin(α) and cos(α) values, and therefore the memory required is nearly half the size of that required to store a quadrant of sine and cosine values. Alternatively, the same amount of memory that is used in a conventional quadrant sine translator stores twice the amount of discrete values of sine and cosine in an octant, thereby increasing data point density and improving the accuracy of the sine and cosine outputs.

The trigonometric approximations in equations (6) and (7) produce sine and cosine approximation errors $\epsilon_{A_{sin}}$ and $\epsilon_{A_{cos}}$ that are bounded by the following equations, respectively:

$$\epsilon_{A_{sin}} = \cos β + \cos α \sin β - \sin α - β \cos α = \sin α (\cos β - 1) + \cos α (\sin β - β) \quad (10)$$

and $$\epsilon_{A_{cos}} = \cos α \cos β - \sin α \sin β - \cos α + β \sin α = \cos α (\cos β - 1) - \sin α (\sin β - β) \quad (11)$$

Replacing cos(β) and sin(β) by the first two terms of their Taylor series, the sine and cosine approximation errors are bounded by the following relationships, respectively:

$$-\left[ \sin α \cdot \frac{β^2}{2} + \cos α \cdot \frac{β^3}{6} \right] < \epsilon_{A_{sin}} < 0 \quad (12)$$

and $$-\left[ \cos α \cdot \frac{β^2}{2} + \sin α \cdot \frac{β^3}{6} \right] < \epsilon_{A_{cos}} < 0 \quad (13)$$

The worst case for both $\epsilon_{A_{sin}}$ and $\epsilon_{A_{cos}}$ occurs at $α = π/4$ radian. The largest contributions to $\epsilon_{A_{sin}}$ and $\epsilon_{A_{cos}}$ are due to their second-order β terms, i.e., $-\sin(α) \cdot β^2/2$ and $-\cos(α) \cdot β^2/2$, respectively, and β is much smaller than α because β represents only the LSBs. It is preferred that the number of bits for α is at least half the word length of θ, so that the errors due to the trigonometric approximation of β are relatively small.

While illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A digital phase to digital sine and cosine translator, comprising:
   a β memory that stores at least some of the least significant bits (LSBs) of a digital input angle word and outputs a value β;
   a sin(α) memory that stores a plurality of sine values within a designated sine octant corresponding to the sine of the most significant bits (MSBs) of said angle word and outputs a value sin(α), said MSBs, said LSBs and a plurality of octant identifier bits together forming said input angle word;
   a cos(α) memory that stores a plurality of cosine values within a designated cosine octant corresponding to the cosine of said MSBs and outputs a value cos(α);
   a cosine multiplier/adder circuit connected to multiply the LSBs of the value cos(α) value by the value β and add it to the LSBs of the value sin(α) to generate the LSBs of a value sin(α)+βcos(α);
   a sine multiplier/adder circuit connected to multiply the LSBs of the value –sin(α) by the value β and add it to the LSBs of the value cos(α) to generate the LSBs of a value cos(α)–βsin(α);
   an incrementor connected to receive the MSBs of the value sin(α) and generate the MSBs of a sine value that covers the whole designated sine octant, said incrementor incrementing the MSBs of the value sin(α) when the most significant bit from the cosine multiplier/adder value represents a carry for the incrementor;
   a decrementor connected to receive the MSBs of the cos(α) value and generate the MSBs of a cosine value that covers the whole designated cosine octant, said decrementor decrementing the MSBs of the value cos(α) when the most significant bit from the sine multiplier/adder value represents a borrow for the decrementor, the MSB values from the incrementor and decrementor and the LSB values from the multiplier/adder circuits being sufficient to represent sine and cosine curve segments of all octants;
   sine and cosine selection circuits connected to said incrementor, decrementor and multiplier/adder circuits to generate sine and cosine outputs; and
   a logic circuit connected to generate at least one control bit to select said sine and cosine outputs according to said octant identifier bits that represent the octant number of said input angle word.

2. The translator of claim 1, wherein said sin(α) memory, cos(α) memory and β memory comprise sin(α) read only memory (ROM), cos(α) ROM and β ROM, respectively.

3. The translator of claim 1, wherein said logic circuit includes an XOR gate connected to XOR two of said octant identifier bits to generate said control bit to switch said selection circuits so that they output said sine and cosine outputs according to the octant number.

4. The translator of claim 3, wherein said logic circuit further includes:
   a plurality of XOR gates connected to resolve additional octants to generate said sine and cosine outputs according to the signs of sine and cosine, respectively, according to said octant identifier bits; and
   a plurality of NOT gates connected to at least some of said logic gates or said octant identifier bits to generate sign bits for said sine and cosine outputs.

5. The translator of claim 4, wherein said octant identifier bits comprise three bits, each bit assigned a zero or a one according to the octant number of said angle word, and said logic circuit further includes an XOR gate connected to complement said LSBs and MSEs in some octants to conform said LSB and MSB inputs to said β, sin(α) and cos(α) memories to said designated sine and cosine octant numbers, respectively.

6. The translator of claim 1, comprising two of said selection circuits, one selection circuit comprising:
   a sine MSB multiplexer (MUX) connected to select the MSBs of said sine output from the outputs of said incrementor and said decrementor according to at least one of said control bits; and
   a sine LSB MUX connected to select the LSBs of said sine output from the outputs of said sine and cosine multiplier/adder circuits according to at least one of said control bits,
   the other selection circuit comprising:
   a cosine MSB MUX connected to select the MSBs of said cosine output from the outputs of said incrementor and said decrementor according to at least one of said control bits; and a cosine LSB MUX connected to select the LSBs of said cosine output from the outputs of said sine and cosine multiplier/adder circuits according to at least one of said control bits.

7. The translator of claim 6, wherein said sine and cosine MSB MUXs each comprise a plurality of transistor switches connected to select the MSBs of said sine and cosine outputs, respectively, at least some of said switches controlled by at least one of said control bits.

8. The translator of claim 7, wherein some of said transistor switches are controlled by at least some of the output bits of said sine or cosine multiplier/adder circuits.

9. The translator of claim 7, wherein said sine and cosine LSB MUXs are controlled by at least one of said control bits.

10. The translator of claim 1, wherein said β memory output comprises a plurality of radix-4 digits, each digit represented by two bits.

11. A digital phase to digital sine and cosine translator, comprising:

a memory that stores at least some of the least significant bits (LSBs) of a digital input angle word and a plurality of sine and cosine values corresponding to the most significant bits (MSBs) of said input angle word within one of the eight octants, said memory outputting a value β representing said LSBs, and values sin(α) and cos(α) for the sine and cosine of said MSBs, respectively;

a cosine multiplier/adder circuit connected to generate the LSBs of sin(α)+βcos(α) from said sin(α), cos(α) and β;

a sine multiplier/adder circuit connected to generate the LSBs of cos(α)−βsin(α) from said sin(α), cos(α) and β;

an incrementor connected to receive the MSBs of the value sin(α) and generate the MSBs of sin(α) values that covers the whole designated sine octant, said incrementor outputting non-incremented and incremented MSBs of the value sin(α)on respective lines;

a decrementor connected to receive the MSBs of the cos(α) value and generate the MSBs of cos(α) values that covers the whole designated cosine octant said decrementor outputting non-decremented and decremented MSBs of the value cos(α) the MSB values from the incrementor and decrementor and the LSB values from the multiplier/adder circuits being sufficient to represent sine and cosine curve segments of all octants;

two selection circuits each connected to said incrementor, decrementor, and multiplier/adder circuits to generate sine and cosine outputs, respectively, in response to a selection control signal according to the octant number of said input angle word and control inputs which represent the MSB from the sine and cosine multiplier/adder output values, said selection circuits selecting the incremented line when the MSB from the cosine muliplier/adder value represents a carry for the incrementor and selecting the decremented line when the MSB from the sine multiplier/adder value represents a borrow for the decrementor; and a logic circuit connected to generate said selection control signal from a plurality of octant identifier bits that determine the octant number of said input angle word.

12. The translator of claim 11, wherein said octant identifier bits comprise three bits, and said logic circuit includes an XOR gate connected to XOR two of said octant identifier bits to generate said control signal to switch said selection circuits so that they output said sine and cosine outputs according to the octant number.

13. The translator of claim 12, wherein said logic circuit further includes:

a plurality of XOR gates connected to resolve additional octants to generate said sine and cosine outputs according to the signs of sine and cosine, respectively, according to said octant identifier bits; and a plurality of NOT gates connected to at least some of said logic gates or said octant identifier bits to generate sign bits for said sine and cosine outputs.

14. The translator of claim 11, wherein said selection circuits comprise:

a first selection circuit comprising:
a sine MSB multiplexer (MUX) connected to select the MSBs of said sine output from the non-incremented, incremented, non-decremented and decremented lines according to said control signal and said control inputs; and
a sine LSB MUX connected to select the LSBs of said sine output from the outputs of said cosine and sine multiplier/adder circuits according to said control signal, and a second selection circuit comprising:
a cosine MSB MUX connected to select the MSBs of said cosine output from the non-incremented, incremented, non-decremented and decremented lines according to said control signal and said control inputs; and
a cosine LSB MUX connected to select the LSBs of said cosine output from the outputs of said cosine and sine multiplier/adder circuits according to said control signal.

15. The translator of claim 14, wherein said sine and cosine MSB MUXs each comprise a plurality of transistor switches connected to select the MSBs of said sine and cosine outputs, respectively, at least some of said switches controlled by said control signal.

16. The translator of claim 15, wherein some of said transistor switches are controlled by at least some of the output bits of said first or second multiplier/adder circuits.

17. The translator of claim 14, wherein said sine and cosine LSB MUXs are controlled by said control signal.

18. The translator of claim 11, wherein said β memory output comprises a plurality of radix-4 digits, each digit represented by two bits.

19. A digital phase to digital sine and cosine translator, comprising:

a memory register for receiving a digital input angle word (θ) that includes a plurality of octant identifier bits and a plurality of angle magnitude bits that are further divided into two numbers α and β that are respectively represented by the angle magnitude bits' most significant bits (MSBS) and (LSBS), the number of MSBs being at least half the length of input angle word θ such that the errors in the trigonometric approximations sin(α+β)=sin(α)+βcos(α) and cos(α+β)=cos(α)−βsin(α) are small;

a β memory that stores a plurality of values of β for the LSBs of the digital input angle word θ and outputs the β value that corresponds to the LSBs in the memory register;

a sin(α) memory that stores a plurality of values of sin(α) within a designated sine octant for the MSBs of said input angle word and outputs the sin(α) value that corresponds to the MSBs in the memory register;

a cos(α) memory that stores a plurality of values of cos(α) within a designated cosine octant for said MSBs and outputs the cos(α) value that corresponds to the MSBs in the memory register;

a cosine multiplier/adder circuit connected to multiply the LSBs of the cos(α) value by the β value and add it to the LSBs of the sin(α) value to generate the LSBs of a value sin(α)+βcos(α);

a sine multiplier/adder circuit connected to multiply the LSBs of the –sin(α) value by the β value and add it to the LSBs of the cos(α) value to generate the LSBs of a value cos(α)–βsin(α);

an incrementor connected to receive the MSBs of the sin(α) value and generate the MSBs of sin(α) values that cover the whole designated sine octant, said incrementor incrementing the MSBs of the sin(α) value when the most significant bit from the cosine multiplier/adder value is carried over to the incrementor;

a decrementor connected to receive the MSBs of the cos(α) value and generate the MSBs of the cos(α) values that covers the whole designated cosine octant, said decrementor decrementing the MSBs of the cos(α)value when the most significant bit from the sine multiplier/adder value is borrowed from the decrementor, the MSB values from the incrementor and decrementor and the LSB values from the multiplier/adder circuits being sufficient to represent sine and cosine curve segments of all octants;

a plurality of selection circuits connected to said incrementor, decrementor and multiplier/adder circuits to generate sine and cosine outputs; and a logic circuit connected to generate at least one control bit to select said sine and cosine outputs according to said octant identifier bits that represent the octant number of said input angle.

20. The translator of claim 19, wherein said incrementor and decrementor respectively output non-incremented and incremented and non-decremented and decremented MSBs of the values sin(α) and cos(α) on respective lines, said selection circuits responding to control inputs that represent the MSB from the sine and cosine multiplier/adder output values and select the incremented line when the MSB from the cosine muliplier/adder value represents a carry for the incrementor and select the decremented line when the MSB from the sine multiplier/adder value represents a borrow for the decrementor.

21. The translator of claim 20, wherein said selection circuits comprise:

a first selection circuit comprising:
    a sine MSB multiplexer (MUX) connected to select the MSBs of said sine output from the non-incremented, incremented, non-decremented and decremented lines according to said control signal and said control inputs; and
    a sine LSB MUX connected to select the LSBs of said sine output from the outputs of said cosine and sine multiplier/adder circuits according to said control signal, and a second selection circuit comprising:
    a cosine MSB MUX connected to select the MSBs of said cosine output from the non-incremented, incremented, non-decremented and decremented lines according to said control signal and said control inputs; and
    a cosine LSB MUX connected to select the LSBs of said cosine output from the outputs of said cosine and sine multiplier/adder circuits according to said control signal.

* * * * *